(12) United States Patent
Hansson

(10) Patent No.: US 11,473,644 B2
(45) Date of Patent: Oct. 18, 2022

(54) FRONT FORK POSITION-DEPENDENT DAMPING FOR BICYCLES AND MOTORCYCLES

(71) Applicant: ÖHLINS RACING AB, Upplands Väsby (SE)

(72) Inventor: Erik Hansson, Upplands Väsby (SE)

(73) Assignee: ÖHLINS RACING AB, Upplands Väsby (SE)

( * ) Notice: Subject to any disclaimer, the term of this patent is extended or adjusted under 35 U.S.C. 154(b) by 67 days.

(21) Appl. No.: 17/069,662

(22) Filed: Oct. 13, 2020

(65) Prior Publication Data
US 2021/0115997 A1    Apr. 22, 2021

(30) Foreign Application Priority Data

Oct. 18, 2019 (EP) ..................... 19204131

(51) Int. Cl.
*F16F 9/48* (2006.01)
*F16F 9/18* (2006.01)
(Continued)

(52) U.S. Cl.
CPC ............ *F16F 9/48* (2013.01); *B62K 25/08* (2013.01); *F16F 9/185* (2013.01); *F16F 9/3214* (2013.01);
(Continued)

(58) Field of Classification Search
CPC .. F16F 9/48; F16F 9/185; F16F 9/3214; F16F 9/3257; F16F 9/34; F16F 9/3405;
(Continued)

(56) References Cited

U.S. PATENT DOCUMENTS

| 1,183,281 A | * | 5/1916 | Derihon | ................ F16F 9/3405 |
| | | | | 188/282.1 |
| 1,658,962 A | * | 2/1928 | Aikens | ...................... F16F 9/48 |
| | | | | 293/50 |

(Continued)

FOREIGN PATENT DOCUMENTS

| GB | 1351333 A | 4/1974 |
| WO | 2018220202 A1 | 12/2018 |

OTHER PUBLICATIONS

European Search Report for EP App. No. 19204131.7 dated Apr. 2, 2020.

*Primary Examiner* — Robert A. Siconolfi
*Assistant Examiner* — James K Hsiao
(74) *Attorney, Agent, or Firm* — Öhlins Racing AB

(57) ABSTRACT

A damper for a telescopic fork leg for a front fork of a vehicle, wherein the damper comprises a twin-tube cylinder and a piston rod assembly comprising a piston rod, wherein a first piston is attached to the inner end portion of the piston rod, wherein a second piston is attached to the piston rod between the first piston and an outer end portion of the piston rod, wherein the inner tube is provided with at least one outlet hole 19 through the wall of the inner tube, the outlet hole being positioned such that a sealing portion of the second piston at compression of the damper travels past at the at least one outlet hole, and wherein the inner tube is provided with at least one return hole through the wall of the inner tube, the at least one return hole being positioned such that it connects a chamber of the twin-tube cylinder to an outer volume of the cylinder.

12 Claims, 3 Drawing Sheets

(51) Int. Cl.
    *B62K 25/08* (2006.01)
    *F16F 9/32* (2006.01)
    *F16F 9/34* (2006.01)
    *F16F 9/36* (2006.01)
    *F16F 13/00* (2006.01)

(52) U.S. Cl.
    CPC .............. *F16F 9/3257* (2013.01); *F16F 9/34* (2013.01); *F16F 9/3405* (2013.01); *F16F 9/368* (2013.01); *F16F 13/007* (2013.01); *F16F 2222/12* (2013.01); *F16F 2228/066* (2013.01); *F16F 2230/30* (2013.01); *F16F 2230/36* (2013.01); *F16F 2230/42* (2013.01); *F16F 2232/08* (2013.01); *F16F 2234/02* (2013.01); *F16F 2234/04* (2013.01)

(58) Field of Classification Search
    CPC ........ F16F 9/368; F16F 9/348; F16F 2222/12; F16F 2228/066; F16F 2230/30; F16F 2230/36; F16F 2230/42; F16F 2232/08; F16F 2234/04; B62K 25/08
    See application file for complete search history.

(56) References Cited

U.S. PATENT DOCUMENTS

| | | | | |
|---|---|---|---|---|
| 2,173,574 A * | 9/1939 | Binder | ...................... | F16F 9/48 188/315 |
| 3,024,874 A * | 3/1962 | De Koning | .............. | F16F 9/185 188/286 |
| 3,556,268 A * | 1/1971 | Fister | ...................... | F16F 9/092 188/315 |
| 3,693,767 A * | 9/1972 | Johnson | ................... | F16F 9/44 188/287 |
| 3,889,934 A * | 6/1975 | Kamman | ................. | B60R 19/32 188/322.15 |
| 4,139,182 A * | 2/1979 | Nagase | ...................... | F16F 9/49 188/315 |
| 4,284,177 A * | 8/1981 | Domek | ................... | F16F 9/486 188/289 |
| 4,337,849 A * | 7/1982 | Siorek | ...................... | F16F 9/52 236/66 |
| 4,482,035 A * | 11/1984 | Heideman | ............... | F16F 9/003 251/259 |
| 4,702,355 A * | 10/1987 | Heideman | ............... | F16F 9/48 137/625.3 |
| 5,018,606 A * | 5/1991 | Carlson | ................... | F16F 9/532 188/300 |
| 5,040,645 A * | 8/1991 | Volpel | ................... | F16F 9/0209 188/287 |
| 5,050,712 A * | 9/1991 | Heideman | ............... | F16F 9/516 188/315 |
| 5,971,117 A * | 10/1999 | Grundei | ................. | F16F 9/346 188/322.19 |
| 5,988,330 A * | 11/1999 | Morris | ................... | F16F 9/466 188/319.1 |
| 6,047,839 A * | 4/2000 | Huggins | ................. | F16F 9/346 213/40 R |
| 6,112,868 A * | 9/2000 | Graham | .................... | F16F 9/48 188/319.2 |
| 6,296,092 B1 * | 10/2001 | Marking | ............... | F16F 9/0209 188/315 |
| 6,311,962 B1 * | 11/2001 | Marking | ............... | B60G 15/14 267/64.25 |
| 6,412,615 B1 * | 7/2002 | Perez | ...................... | F16F 9/486 188/287 |
| 6,648,109 B2 * | 11/2003 | Farr | ...................... | F16F 9/3235 188/315 |
| 6,776,269 B1 * | 8/2004 | Schel | ...................... | F16F 9/346 188/316 |
| 8,123,006 B1 * | 2/2012 | Schroeder | ................ | F16F 9/48 188/322.19 |
| 8,167,099 B2 * | 5/2012 | Lassus | .................... | F16F 9/063 188/297 |
| 8,196,723 B1 * | 6/2012 | Shore | ........................ | F16F 9/46 188/316 |
| 8,251,355 B2 * | 8/2012 | Tomiuga | .................. | F16F 9/18 188/315 |
| 8,376,159 B2 * | 2/2013 | Mombour | ................ | F16F 9/48 213/43 |
| 8,381,887 B2 * | 2/2013 | Sawai | ...................... | F16F 9/348 188/282.5 |
| 8,672,306 B2 * | 3/2014 | Uchiyama | ............. | F16F 9/5126 188/282.4 |
| 8,820,494 B2 * | 9/2014 | Nagai | ....................... | F16F 9/36 188/315 |
| 8,863,918 B2 * | 10/2014 | Murakami | ............. | F16F 9/064 188/269 |
| 9,038,791 B2 * | 5/2015 | Marking | ................. | F16F 9/512 188/316 |
| 9,038,792 B2 * | 5/2015 | Sumida | .................. | B62K 25/08 188/314 |
| 9,133,902 B2 * | 9/2015 | Spyche, Jr. | ............... | F16F 9/44 |
| 9,964,171 B2 * | 5/2018 | Firek | ...................... | F16F 9/5126 |
| 10,400,843 B2 * | 9/2019 | Yoshida | ................. | F16F 9/585 |
| 11,021,204 B2 * | 6/2021 | Pelot | ...................... | G05B 15/02 |
| 11,067,148 B2 * | 7/2021 | Fiorinotto | ............... | F16F 9/18 |
| 11,199,237 B2 * | 12/2021 | Anderson | ............ | F16F 9/3235 |
| 2003/0047397 A1 * | 3/2003 | Farr | ...................... | F16F 9/48 188/282.8 |
| 2008/0023935 A1 * | 1/2008 | McAndrews | ........... | F16F 9/516 280/283 |
| 2009/0101459 A1 * | 4/2009 | Sawai | ...................... | F16F 9/065 188/266.6 |
| 2011/0221108 A1 * | 9/2011 | Uchiyama | ............. | F16F 9/5126 267/217 |
| 2012/0313305 A1 * | 12/2012 | Knobloch | ................ | F16F 9/48 267/126 |
| 2014/0202808 A1 * | 7/2014 | Spyche, Jr. | .............. | F16F 9/512 188/314 |
| 2017/0219043 A1 | 8/2017 | Firek | | |
| 2018/0051766 A1 * | 2/2018 | Yamagai | ................ | F16F 9/3235 |
| 2020/0072312 A1 * | 3/2020 | Dobinson | ............. | F16F 9/3235 |
| 2021/0380194 A1 * | 12/2021 | Nakagawa | ............ | F16F 13/007 |

\* cited by examiner

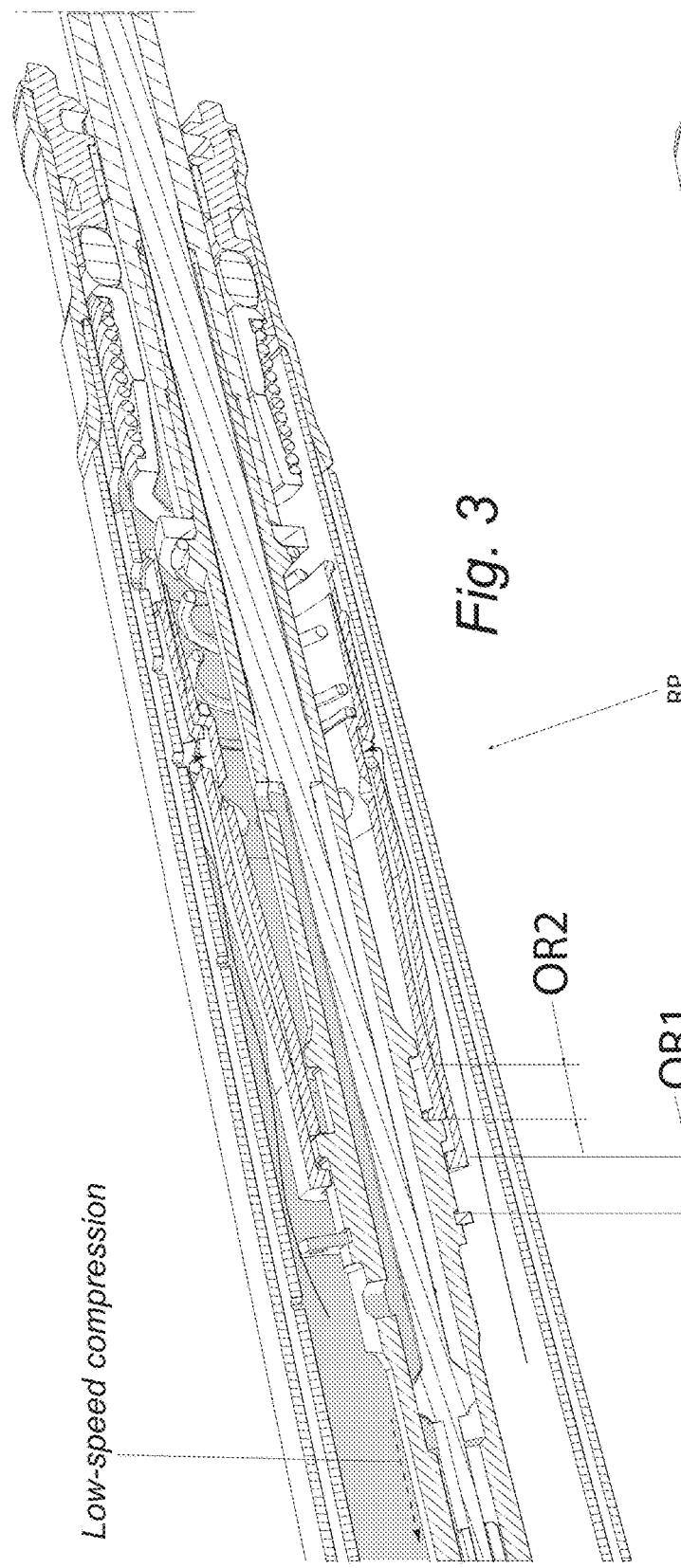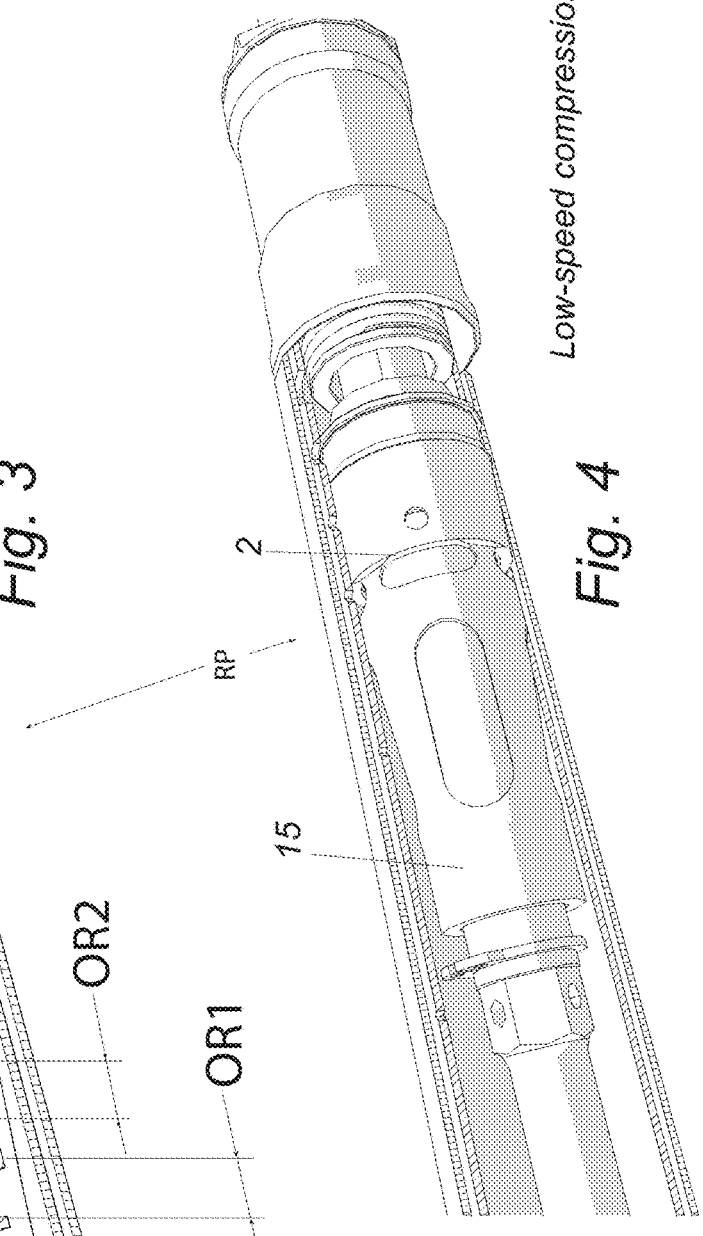
Fig. 3
Fig. 4

FRONT FORK POSITION-DEPENDENT DAMPING FOR BICYCLES AND MOTORCYCLES

CROSS-REFERENCE TO RELATED APPLICATIONS

This application claims priority to European Application No. EP 19204131.7, filed on Oct. 18, 2019, which application is hereby incorporated herein by reference in its entirety.

TECHNICAL FIELD

The present disclosure relates to shock absorbers for vehicle suspensions and more specifically to a damper for a telescopic fork leg for a front fork of a vehicle such as a motorcycle. The shock absorber comprises a cylinder and a piston rod assembly including a piston, the cylinder and piston being attached to different parts of the vehicle such that the piston moves within the cylinder at compression and extension of the shock absorber. The shock absorber also includes a spring configured to bias the shock absorber towards its extended position. The spring is typically a coil spring or air spring. A working medium is provided within the shock absorber and pumped though the shock absorber by the piston at compression and/or extension of the shock absorber, wherein the working medium is guided through one or more flow paths controlling the flow rate, to provide damping of movement of the shock absorber. The flow paths commonly include shim stacks and other types of flow resistance regulating mechanisms, such as non-return valves, affecting the damping provided by the shock absorber.

BACKGROUND

It is often desirable to configure a shock absorber such that its damping is position-dependent, for example offering more damping at the end of a compression stroke than in the beginning of the compression stroke. Also, it is often desirable to configure a shock absorber such that it offers different damping at different compression rates of the shock absorber.

For motorcycles, the front suspension and the rear suspension have different designs.

A modern motorcycle rear suspension often has a swing arm acting on a telescoping shock absorber. The compression of the shock absorber is thus not linear to the rotation of the swing arm carrying the rear wheel, which in turn makes the damping position-dependent.

A motorcycle front suspension is often based on a fork with telescopic fork legs. Each fork leg comprises a damper and the compression of the damper is thus linear to the movement of the wheel suspended which gives not position-dependent damping by geometry of the suspension as with the rear suspension. Hence, a position-dependent damper for a telescopic front fork of a vehicle, such as a motorcycle, would be beneficial. Also, such a damper offering compression rate-dependent damping characteristics would be beneficial.

SUMMARY

Brief Description of Drawings

FIGS. 1-3 all relate to a damper according to a first example of the disclosure.

FIG. 1 shows a damper according to a first example in a compressed position on its way out for extension of the damper and with the valve in the second piston thus open.

FIG. 2 shows the damper of FIG. 1 in under a high-speed compression stroke with the high-pressure valve in the second piston thus open for a fluid flow in the opposite direction to the one shown in FIG. 1.

FIGS. 3-4 show the damper at low-speed compression with the valve-body in the restricting position preventing flow through the second piston. FIG. 3 shows the damper in cross-section and FIG. 4 corresponds to FIG. 3 but with the second piston shown in full (i.e. not in cross-section).

DETAILED DESCRIPTION

Figure 1:
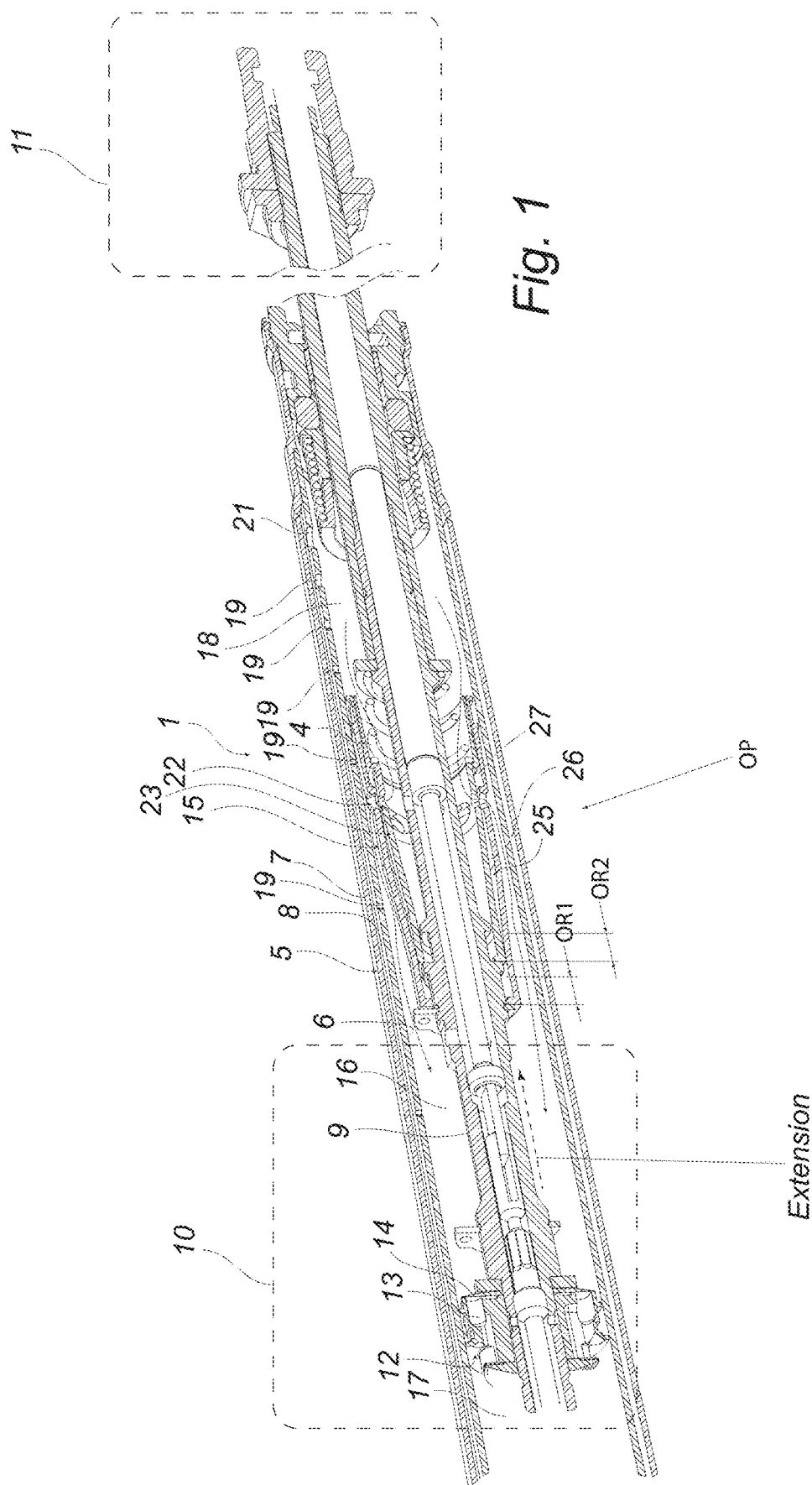

The disclosure provides an improved damper for a telescopic fork leg for a front fork of a vehicle exhibiting a position-dependent damping characteristic offering higher damping further into a compression stroke than in the beginning of a compression stroke of the damper. The damper includes a twin-tube cylinder comprising an inner tube and an outer tube defining a chamber between the inner tube and the outer tube. Also, the damper includes a piston rod assembly including a piston rod having an inner end portion inside the cylinder and an outer end portion outside the cylinder, wherein the piston rod assembly is movable within the cylinder back and forth between a compressed position and an extended position, wherein a first piston is attached to the inner end portion of the piston rod, and wherein the first piston is provided with at least one first fluid channel through the piston and a valve assembly configured to control fluid flow through the first fluid channel. A second piston is attached to the piston rod between the first piston and the outer end portion of the piston rod such that the first piston and second piston are spaced apart together defining an intermediate volume inside the cylinder between the first piston and the second piston. The first piston separates the intermediate volume from an inner volume inside the inner tube. The second piston separates the intermediate volume from an outer volume inside the inner tube. The inner tube is provided with at least one outlet hole through the wall of the inner tube, the outlet hole being positioned such that a sealing portion of the second piston is movable past the at least one outlet hole (19) at compression of the damper. Also, the inner tube is provided with at least one return hole through the wall of the inner tube, the at least one return hole being positioned such that it connects the chamber of the twin-tube cylinder to the outer volume.

At compression of the damper, fluid flows from the inner volume through the at least one first fluid channel of the first piston and into the intermediate volume. The outlet hole, the chamber of the twin-tube cylinder and the return hole together form a bypass passage through which fluid can bypass the second piston and return into the cylinder behind the second piston. Hence, the bypass passage allows fluid to leave the intermediate volume as fluid enters the intermediate volume from the inner volume. The valve assembly of the first piston provides a first damping characteristic independently of the position of the piston rod in the cylinder. As the sealing portion of the second piston passes the at least one outlet hole, the bypass passage is restricted since the available area for fluid to leave the intermediate volume through is restricted or blocked. Hence, the provision of a second piston combined with the bypass passage provides a position-dependent damping characteristic which can be adapted by sizing and positioning of the outlet holes.

The damper may include a plurality of the outlet holes, wherein the outlet holes are distributed along the length of the inner tube.

By providing more than one outlet hole, a variable outlet area is provided between the intermediate volume and the chamber of the twin-tube wall, which variable outlet area varies throughout a compression stroke as the sealing portion of the second piston passes outlet holes.

The size of the outlet holes may decrease along the length of the damper with larger holes further out and smaller holes further in.

The decreasing size of the holes enable a high degree of variation of the area of the outlet holes in response to movement of the sealing portion at compression of the damper.

The second piston may be frustoconical with an inner narrower portion sealingly engaging the piston rod and the outer wider sealing portion sealingly engaging the inner tube, wherein the second piston comprises a second fluid channel connecting the intermediate volume and the outer volume. The piston rod assembly comprises a valve body attached to the piston rod on the outer volume-side of the second piston. The valve body and the second piston are movable relative to each other along the piston rod such that the valve body is positionable in a restricting position relative to the second piston, in which restricting position the valve body is seated on an inner circumferential portion of the second piston for mitigating fluid flow through the second fluid channel, and such that the valve body is positionable in an open position relative to the second piston in which open position the valve body does not mitigate fluid flow through the second fluid channel.

The frustoconical second piston thus opens outwards, i.e. towards the outlet end of the twin tube cylinder through which outlet end the piston rod is outwardly moved at extension of the damper. Accordingly, the inner end is the opposite end of the twin tube cylinder. The valve body is movable into the inner space of the second piston to restrict fluid flow through the second piston. Generally, it is thus not decisive to the throttling function of the valve body if it is the vale body or the second piston that moves, since it is merely their relative position that determines the throttling of fluid flow through the second piston. However, since fluid pressure is used to move the second piston and/or the valve body at compression and extension of the damper their design and movements must be adapted accordingly such that they open and close when intended.

The second piston may be movably attached to the piston rod for movement back and forth along the piston rod through a first operational range relative to the piston rod. The first operational range is such that at compression of the damper the second piston is movable towards and together with the valve body for bringing the valve body into the restricting position. Also, the first operational range is such that at extension of the damper the second piston is moveable away from the valve body for bringing the valve body to the open position. The length and positioning of each operational range is determined by the freedom of movement of the respective involved parts and can be controlled in any suitable way such as by mechanical stops limiting movement of parts involved. The design is adapted accordingly to control the length and position of the operational ranges.

By making the second piston movable back and forth along the piston rod, the fluid pressure in the damper is able to force the second piston outwards, towards the valve body, upon compression of the damper. If the valve body is also movable back and forth along the piston rod, the valve body and the second piston may move together for some distance. At extension of the damper the second piston is movable far enough inwards in the damper to bring the valve body out of its restricting position and into its open position. This enables a lower flow resistance through the second piston at extension of the damper than at compression of the damper.

The valve body may be movably attached to the piston rod for movement back and forth along the piston rod through a second operational range relative to the piston rod. The piston rod assembly comprises a biasing means configured to bias the valve body towards the restricting position. The second operational range is such that when the second piston at compression of the damper is at an outer end portion of the first operational range, the valve body is movable away from the second piston against the biasing force of the biasing means thereby bringing the valve body towards the open position.

At lower compression speeds, the fluid pressure in the damper is not high enough to move the valve body against the force of the biasing means and thus the valve body remains in its restriction position. However, at higher compression speeds, the fluid pressure in the damper will eventually cause a force large enough to move the valve body against the force of the biasing means to its open position, thereby enabling a higher fluid flow through the second piston. Such a damper thus enables different damping characteristic at low compression speeds as compared to high compression speeds The valve body may in its restricting position together with the second piston define a first fluid chamber delimited by a first pressure surface of the valve body, wherein the first pressure surface is configured to provide a first area for fluid pressure to act on for forcing the valve body outwards against the force of the biasing means. The fluid chamber is always open for some pressure to be transmitted from the intermediate volume and can thus enable a spread of fluid pressure over the first area to thereby force the valve body outwards The valve body is provided with a second pressure surface radially outside of the first pressure surface, wherein the valve body and the second piston are configured such that when the valve body is in the restricting position, the valve body seals to the second piston to prevent fluid pressure in the first fluid chamber from reaching the second pressure surface, and wherein the valve body and the second piston are configured such that the sealing engagement that separates the first pressure surface from the second pressure surface is interrupted once the valve body is moved a predetermined distance away from the second piston against the force of the biasing means.

By providing a second pressure surface and so separating it from the first pressure surface, only the first area is initially available for the pressure to act on for forcing the valve body against the force of the biasing means. Once the valve body starts to move, the pressure spreads to also act on the second pressure surface, which in turn enables a much higher total force acting on the valve body using the same pressure such that the movement of the valve body is more distinct.

The second fluid channel of the second piston may comprise one or more first radial fluid passages through the second piston, wherein the valve body is frustoconical and comprises one or more second radial fluid passages configured such that the first and second radial fluid passages align when the valve body is at the outer end of the second operational range and the second piston is at the outer end of the first operational range.

A second aspect of the disclosure relates to a telescopic fork leg for a front fork of a vehicle, the telescopic fork leg comprising a damper as described above.

When a suspended wheel hits an obstacle and compresses a damper it is often Such a fork leg is advantageous since it provides for a non-linear damping characteristic throughout the compression stroke of the fork leg by incorporating the non-linear damper into the linearly compressing telescopic fork leg. Non-linear damping is commonly only found in rear bicycle suspensions comprising a swing arm connected to a linear damper through a mechanism enabling linear movement of the suspended wheel to be translated into a non-linear compression movement of the damper, thereby achieving non-linear damping despite the use of a linear damper.

A third aspect of the disclosure relates to a front fork for a vehicle, the front fork comprising a telescopic fork leg as described above.

A fourth aspect of the disclosure relates to a vehicle comprising a front fork as described above. The vehicle may be a bicycle, such as a mountain bike or a motocross bike.

A damper 1 according to a first example will hereinafter be described with reference to the appended drawings.

The damper 1 is typically used in a front fork of a vehicle such as a mountain bike. The damper 1 comprises a twin-tube cylinder 5 comprising an inner tube 6 and an outer tube 7 defining a chamber 8 between the inner tube 6 and the outer tube 7. The tubes 6, 7 are made of aluminum but could in other examples be made of any other suitable metal or other suitable material. The damper 1 comprises a piston rod assembly comprising a piston rod 9 having an inner end portion 10 inside the cylinder 5 and an outer end portion 11 outside the cylinder 5. The piston rod assembly is movable within the cylinder 5 back and forth between a compressed position and an extended position. A first piston 12 is attached to the inner end portion 10 of the piston rod. The first piston 12 is provided with at least one first fluid channel 13 through the first piston 12 and a valve assembly 14 configured to control flow resistance through the first fluid channel 13 at compression and/or extension of the damper 1.

The damper 1 also comprises a second piston 15 attached to the piston rod 9 between the first piston 12 and the outer end portion 11 of the piston rod 9 such that the first piston 12 and the second piston 15 are spaced apart together defining an intermediate volume 16 inside the cylinder 5 between the first piston 12 and the second piston 15. The first piston 12 separates the intermediate volume 16 from an inner volume 17 inside the inner tube 6. The second piston 15 separates the intermediate volume 16 from an outer volume 18 inside the inner tube 6. The inner tube 6 is provided with a plurality of outlet holes 19 through the wall of the inner tube 6. In other examples one outlet hole 19 could alternatively be provided but that would provide less control of the damping throughout a compression stroke of the damper as compared to the provision of a higher number of outlet holes 19 distributed along the length of the damper 1. The outlet holes 19 are distributed along the length of the inner tube 6 and positioned such that a sealing portion 20 of the second piston 15 is movable past the outlet holes 19. The inner tube 6 is provided with one return hole 21 through the wall of the inner tube 6 but could in other examples alternatively comprise additional return holes 21. The return hole 21 is positioned such that it connects the chamber 8 of the twin-tube cylinder 5 to the outer volume 18. The position of the return hole 21 is thus at the outer end of the inner tube 6 such that the second piston 15 cannot move past the return hole 21 at extension of the damper 1 (under normal use of the damper 1).

At compression of the damper 1, fluid flows from the inner volume 17 through the at least one first fluid channel 13 of the first piston 12 and into the intermediate volume 16. The outlet hole 19, the chamber 8 of the twin-tube cylinder and the return hole 21 together form a bypass passage through which fluid can bypass the second piston 15 and return into the cylinder outside of the second piston 15. Hence, the bypass passage allows fluid to leave the intermediate volume 16 as fluid enters the intermediate volume 16 from the inner volume 17. The valve assembly of the first piston 12 provides a first damping characteristic independently of the position of the piston rod in the cylinder. As the sealing portion of the second piston 15 passes the at least one outlet hole 19 on its way inwards at compression of the damper 1, the bypass passage is restricted since the available area for fluid to leave the intermediate volume 16 through is further restricted or blocked. Hence, the provision of a second piston 15 combined with the bypass passage provides a position-dependent damping characteristic which can be adapted by sizing and positioning of the outlet holes 19.

In this example, the size of the outlet holes 19 decreases along the length of the damper 1 with larger holes 19 further out and with smaller holes 19 further in along the cylinder 5. In other examples, the size of the outlet holes 19 may alternatively be constant for all outlet holes 19, or have some other distribution. The provision of decreasing size of the outlet holes 19 along the length of the cylinder 5 enable a high degree of variation of the area of the outlet holes in response to movement of the sealing portion at compression of the damper 1.

The second piston 15 is frustoconical with an inner narrower portion sealingly engaging the piston rod 9 and the outer wider sealing portion 20 sealingly engaging the inner tube 6. As shown in the figures, the shape is generally frustoconical its cross-sectional shape widening along the length of the valve body and thus frustoconical should be interpreted accordingly. The second piston 15 comprises a second fluid channel 22 connecting the intermediate volume 16 and the outer volume 18. The piston rod assembly comprises a valve body 23 attached to the piston rod 9 on the outer volume-side of the second piston 15. The valve body 23 and the second piston 15 are movable relative to each other along the piston rod 9 such that the valve body 23 is positionable in, i.e. movable to, a restricting position RP relative to the second piston 15. In the restricting position RP, the valve body 23 is seated on an inner circumferential portion 24 of the second piston 15 for mitigating fluid flow through the second fluid channel 22 although any suitable sealing relationship would alternatively work. The valve body 23 is positionable in, i.e. movable to, an open position OP relative to the second piston 15 in which open position OP the valve body 23 does not mitigate fluid flow through the second fluid channel 22.

The frustoconical second piston 15 thus opens outwards, i.e. is widening towards the outer end of the twin tube cylinder 5. The outer end of the cylinder 5 is the end through which the piston rod is outwardly moved at extension of the damper 1. Accordingly, the inner end of the cylinder 5 is the opposite end of the twin tube cylinder 5 relative to the outer end. The valve body 23 is movable into the inner space of the second piston 15 to restrict fluid flow through the second piston 15.

The second piston 15 is movably attached to the piston rod 9 for movement back and forth along the piston rod 9 through a first operational range OR1 relative to the piston rod 9. The first operational range OR1 is configured such that at compression of the damper 1 the second piston 15 is movable towards and/or together/against the valve body for bringing the valve body into the restricting position RP. Also, the first operational range OR1 is such that at extension of the damper 1 the second piston 15 is moveable away from the valve body 21 for bringing the valve body 21 to the open position.

The valve body 21 is movably attached to the piston rod 9 for movement back and forth along the piston rod 9 through a second operational range OR2 relative to the piston rod 9. The piston rod assembly comprises a biasing means 4 configured to bias the valve body towards the restricting position. The biasing means is a coil spring, but could alternatively be any other suitable biasing means such as a piece of resilient material for example a suitable elastomer. The second operational range OR2 is configured such that when the second piston 15 at compression of the damper 1 is at an outer end portion of the first operational range OR1, the valve body is movable away from the second piston against the biasing force of the spring 4 thereby bringing the valve body 21 towards the open position OP.

The valve body 21 in its restricting position RP together with the second piston 15 define a first fluid chamber 25 delimited by a first pressure surface 26 of the valve body 21. The first pressure surface 26 is configured to provide a first area for fluid pressure to act on for forcing the valve body 21 outwards against the force of the spring 4.

The valve body 21 is provided with a second pressure surface 27 radially outside of the first pressure surface 26. The second pressure surface here has the shape of a radial step in the circumference of the valve body 21 but could in other examples have some other shape such as a continuous smooth contour extending radially outwards without any step.

The valve body 21 and the second piston 15 are configured such that when the valve body 21 is in the restricting position RP, the valve body 21 seals to the second piston 15 to prevent fluid pressure in the first fluid chamber from reaching the second pressure surface 27. The valve body 21 and the second piston 15 are further configured such that the sealing engagement that separates the first pressure surface 26 from the second pressure surface 27 is interrupted once the valve body is moved a predetermined distance away from the second piston 15 against the force of the spring 4. In other examples, the second pressure surface may alternatively be omitted, although the damper then loses some of the distinctness of the opening characteristics of the flow through the second piston 15 at high speed compression of the damper 1. Also, the step in the present example provides the dual function of providing a sealing engagement and an axial stop for the spring to force the valve body against. In other examples, the sealing engagement between the first pressure surface and the second pressure surface could alternatively be corresponding cylindrical portions of the second piston 15 and the valve body 21, wherein the cylindrical portions extend parallel to the piston rod 9.

Figure 2:
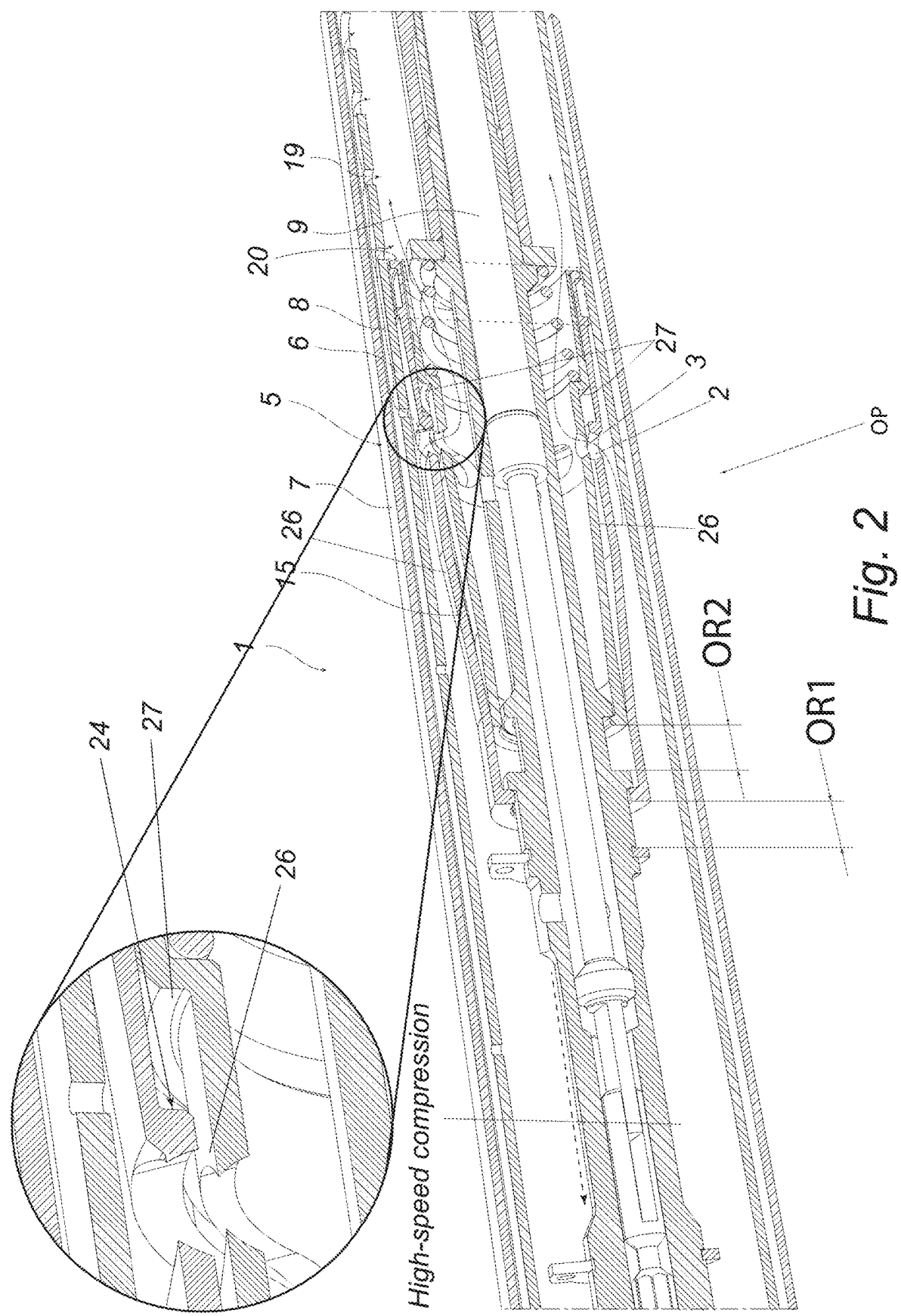

The second fluid channel 22 of the second piston 15 comprises a plurality of first radial fluid passages 2 through the second piston 15. The valve body 21 is also substantially frustoconical but may in other examples alternatively have any other suitable shape. The valve body 21 comprises one or more second radial fluid passages 2 configured such that the first 2 and second 3 radial fluid passages align when the valve body 21 is at the outer end of the second operational range OR2 and the second piston is at the outer end of the first operational range OR1. This is shown in FIG. 1. Similarly, the first 2 and second 3 radial fluid passages align upon extension of the damper as the second piston 15 is forced to its inner end of its first operational range OR1 whilst at the same time, the valve body 21 is forced to the inner end of its second operational range OR2. This is shown in FIG. 2. Alternatively, an additional pair of openings in the second piston and the valve body may be provided to align at high speed compression and/or at extension of the damper to provide for high fluid flow through the second piston at high speed compression and extension respectively. However, in any configuration the openings should not align at low speed compression of the damper since it is preferable to have a higher resistance towards fluid flow through the second piston 15 at low speed compression of the damper 1.

The valve body is provided with a protrusion at its inner end, the protrusion extending radially inwards from a portion of its circumference. In use, with the second piston centered about piston rod, the protrusion engages a circumferential heel of the piston rod to thereby prevent movement outwards along the piston rod 9 in use. In use, the inner end of the second piston centers the second piston 15 about the piston rod 9, wherein the second piston and the valve body are configured such that the centered second piston centers the valve body about the piston rod. Further, the central hole of the valve body through which the piston rod passes is wide enough to allow the valve body to be radially displaced with respect to the piston rod a predetermined radial distance, wherein the protrusion of the valve body is configured small enough to be movable past the heel of the piston rod when the valve body is displaced the predetermined distance. This configuration allows the valve body to be mounted to the piston rod by hand with no fasteners or clips where after the second piston is slid onto the piston rod and over and around the valve body, thereby centering the valve body about the piston rod such that the valve body is locked in place and cannot be pulled past the heel and off the piston rod.

The present disclosure also proposes the use of the above disclosed damper in a telescopic fork leg for a front fork of a vehicle such as a moto cross bike or a mountain bike. Hence, the telescopic fork leg comprises the damper. Typically, a front fork comprises two such fork legs but may comprise only one such leg.

When a suspended wheel hits an obstacle and compresses a damper it is often Such a fork leg is advantageous since it provides for a non-linear damping characteristic throughout the compression stroke of the fork leg by incorporating the non-linear damper into the linearly compressing telescopic fork leg. Non-linear damping is commonly only found in rear bicycle suspensions comprising a swing arm connected to a linear damper through a mechanism enabling linear movement of the suspended wheel to be translated into a non-linear compression movement of the damper, thereby achieving non-linear damping despite the use of a linear damper.

The invention claimed is:

1. A damper for a telescopic fork leg for a front fork of a vehicle comprising:
    a twin-tube cylinder including an inner tube and an outer tube defining a chamber between the inner tube and the outer tube,
    a piston rod assembly including a piston rod having an inner end portion inside the cylinder and an outer end portion outside the cylinder, wherein the piston rod assembly is movable within the cylinder back and forth between a compressed position and an extended position, wherein a first piston is attached to the inner end portion of the piston rod, wherein the first piston is provided with at least one first fluid channel through the first piston and a valve assembly configured to control fluid flow through the first fluid channel, a second piston is attached to the piston rod between the first piston and the outer end portion of the piston rod such that the first piston and the second piston are spaced apart together defining an intermediate volume inside the cylinder between the first piston and the second piston, wherein the first piston separates the intermediate volume from an inner volume inside the inner tube, wherein the second piston separates the intermediate volume from an outer volume inside the inner tube, wherein the inner tube is provided with at least one outlet hole through the wall of the inner tube, said outlet hole being positioned such that a sealing portion of the second piston is entirely movable past the at least one outlet hole at compression of the damper, such that the at least one outlet hole fluidly connects the chamber of the twin-tube cylinder with the outer volume, and wherein the inner tube is provided with at least one return hole through the wall of the inner tube, said at least one return hole being positioned such that it connects the chamber of the twin-tube cylinder to the outer volume.

2. A damper according to claim 1, comprising a plurality of said outlet holes, wherein the outlet holes are distributed along the length of the inner tube.

3. A damper according to claim 2, wherein the size of the outlet holes decreases along the length of the damper with larger holes further towards the outer end of the inner tube and with smaller holes further towards the inner end of the inner tube.

4. A damper according to claim 3, wherein the second piston is frustoconical with an inner narrower portion sealingly engaging the piston rod and the outer wider sealing portion sealingly engaging the inner tube, wherein the second piston comprises a second fluid channel connecting the intermediate volume and the outer volume, wherein the piston rod assembly comprises a valve body attached to the piston rod on the outer volume-side of the second piston, and wherein the valve body and the second piston are movable relative to each other along the piston rod such that the valve body is positionable in a restricting position relative to the second piston, in which restricting position the valve body is seated on an inner circumferential portion of the second piston for mitigating fluid flow through the second fluid channel, and such that the valve body is positionable in an open position relative to the second piston in which open position the valve body does not mitigate fluid flow through the second fluid channel.

5. A damper according to claim 3, wherein the second piston is movably attached to the piston rod for movement back and forth along the piston rod through a first operational range relative to the piston rod, wherein the first operational range is such that at compression of the damper the second piston is movable towards and together with the valve body for bringing the valve body into the restricting position, and wherein the first operational range is such that at extension of the damper the second piston is moveable away from the valve body for bringing the valve body to the open position.

6. A damper according to claim 5, wherein the valve body is movably attached to the piston rod for movement back and forth along the piston rod through a second operational range relative to the piston rod, wherein the piston rod assembly comprises a biasing means configured to bias the valve body towards the restricting position, and wherein the second operational range is such that when the second piston at compression of the damper is at an outer end portion of the first operational range, the valve body is movable away from the second piston against the biasing force of the biasing means thereby bringing the valve body towards the open position.

7. A damper according to claim 6, wherein the valve body in its restricting position together with the second piston defines a first fluid chamber delimited by a first pressure surface of the valve body, wherein the first pressure surface is configured to provide a first area for fluid pressure to act on for forcing the valve body outwards against the force of the biasing means.

8. A damper according to claim 7, wherein the valve body is provided with a second pressure surface radially outside of the first pressure surface, wherein the valve body and the second piston are configured such that when the valve body is in the restricting position, the valve body seals to the second piston to prevent fluid pressure in the first fluid chamber from reaching the second pressure surface, and wherein the valve body and the second piston are configured such that the sealing engagement that separates the first pressure surface from the second pressure surface is interrupted once the valve body is moved a predetermined distance away from the second piston against the force of the biasing means.

9. A damper according to claim 8, wherein the second fluid channel of the second piston comprises one or more first radial fluid passages through the second piston, and wherein the valve body is frustoconical and comprises one or more second radial fluid passages configured such that the first and second radial fluid passages align when the valve body is at the outer end of the second operational range and the second piston is at the outer end of the first operational range.

10. A front fork for a vehicle, said front fork comprising a telescopic fork leg according to claim 9.

11. A damper for a telescopic fork leg for a front fork of a vehicle comprising:

a twin-tube cylinder including an inner tube and an outer tube defining a chamber between the inner tube and the outer tube, a piston rod assembly including a piston rod having an inner end portion inside the cylinder and an outer end portion outside the cylinder, wherein the piston rod assembly is movable within the cylinder back and forth between a compressed position and an extended position, wherein a first piston is attached to the inner end portion of the piston rod, wherein the first piston is provided with at least one first fluid channel through the first piston and a valve assembly configured to control fluid flow through the first fluid channel, a second piston is attached to the piston rod between the first piston and the outer end portion of the piston rod such that the first piston and the second piston are spaced apart together defining an intermediate volume inside the cylinder between the first piston and the second piston, wherein the first piston separates the intermediate volume from an inner volume inside the inner tube, wherein the second piston separates the intermediate volume from an outer volume inside the inner tube, wherein the inner tube is provided with at least one outlet hole through the wall of the inner tube, said outlet hole being positioned such that a sealing portion of the second piston is movable past the at least one outlet hole at compression of the damper, wherein the inner tube is provided with at least one return hole through the wall of the inner tube, said at least one return hole being positioned such that it connects the chamber of the twin-tube cylinder to the outer volume, and wherein the second piston is frustoconical with an inner narrower portion sealingly engaging the piston rod and the outer wider sealing portion sealingly engaging the inner tube, wherein the second piston comprises a second fluid channel connecting the intermediate volume and the outer volume, wherein the piston rod assembly comprises a valve body attached to the piston rod on the outer volume-side of the second piston, and wherein the valve body and the second piston are movable relative to each other along the piston rod such that the valve body is positionable in a restricting position relative to the second piston, in which restricting position the valve body is seated on an inner circumferential portion of the second piston for mitigating fluid flow through the second fluid channel, and such that the valve body is positionable in an open position relative to the second piston in which open position the valve body does not mitigate fluid flow through the second fluid channel.

12. A damper for a telescopic fork leg for a front fork of a vehicle comprising:

a twin-tube cylinder including an inner tube and an outer tube defining a chamber between the inner tube and the outer tube, a piston rod assembly including a piston rod having an inner end portion inside the cylinder and an outer end portion outside the cylinder, wherein the piston rod assembly is movable within the cylinder back and forth between a compressed position and an extended position, wherein a first piston is attached to the inner end portion of the piston rod, wherein the first piston is provided with at least one first fluid channel through the first piston and a valve assembly configured to control fluid flow through the first fluid channel, a second piston is attached to the piston rod between the first piston and the outer end portion of the piston rod such that the first piston and the second piston are spaced apart together defining an intermediate volume inside the cylinder between the first piston and the second piston, wherein the first piston separates the intermediate volume from an inner volume inside the inner tube, wherein the second piston separates the intermediate volume from an outer volume inside the inner tube, wherein the inner tube is provided with at least one outlet hole through the wall of the inner tube, said outlet hole being positioned such that a sealing portion of the second piston is movable past the at least one outlet hole at compression of the damper, and wherein the inner tube is provided with at least one return hole through the wall of the inner tube, said at least one return hole being positioned such that it connects the chamber of the twin-tube cylinder to the outer volume, wherein the second piston is movably attached to the piston rod for movement back and forth along the piston rod through a first operational range relative to the piston rod, wherein the first operational range is such that at compression of the damper the second piston is movable towards and together with the valve body for bringing the valve body into the restricting position, and wherein the first operational range is such that at extension of the damper the second piston is moveable away from the valve body for bringing the valve body to the open position.

* * * * *